United States Patent [19]
Arai

[11] 3,774,515
[45] Nov. 27, 1973

[54] OPENING AND CLOSING MECHANISM FOR ELECTRONIC SHUTTER

[75] Inventor: Kiyoyuki Arai, Gyoda, Japan

[73] Assignee: Kabushiki Kaisha Koparu, Tokyo-to, Japan

[22] Filed: Feb. 15, 1973

[21] Appl. No.: 332,638

Related U.S. Application Data

[63] Continuation of Ser. No. 118,902, Feb. 25, 1971, abandoned.

[52] U.S. Cl. .................... 95/53 E, 95/53 EB, 95/63
[51] Int. Cl. .............................................. G03b 9/20
[58] Field of Search ............. 95/53 R, 53 E, 53 EB, 95/62, 63

[56] References Cited
UNITED STATES PATENTS

| | | | |
|---|---|---|---|
| 3,418,904 | 12/1968 | Wick et al. | 95/53 EB |
| 3,356,004 | 12/1967 | Kiper | 95/63 |
| 3,439,595 | 4/1969 | Kiper | 95/63 X |
| 3,507,201 | 4/1970 | Fahlenberg et al. | 95/53 EB |
| 3,559,547 | 2/1971 | Rentschler | 95/53 EB |
| 3,541,942 | 11/1970 | Bertram et al. | 95/63 |

Primary Examiner—Samuel S. Matthews
Assistant Examiner—Russell E. Adams, Jr.
Attorney—John W. Malley et al.

[57] ABSTRACT

A mechanical arrangement for electronically controlled photographic shutter, includes a ring rotatably mounted around the exposure aperture of the camera and, a pair of shutter blades coupled to each other and rotatably mounted respectively on fixed pins extending from said ring, one of which blades having an urging spring mounted thereon to act in the opening direction, a cam face adapted to be brought into engagement with said one of the blades having an urging spring in accordance with the movement of said ring to impart the blades a motion to open progressively, and a closing member capable of engaging, whenever a proper exposure has been obtained, the spring urged blade even in the midst of the blade's opening motion by the action of an electromagnet connected to an electronic exposure time control circuit thereby coercively displacing the shutter blades toward the closing directions. The above described arrangement is operative so that, upon generation of an electric signal indicating the completion of an exposure, the exposure aperture is closed without delay.

2 Claims, 2 Drawing Figures

OPENING AND CLOSING MECHANISM FOR ELECTRONIC SHUTTER

BACKGROUND OF THE INVENTION

This is a continuation of application Ser. No. 118,902, filed Feb. 25, 1971, and now abandoned.

FIELD OF THE INVENTION

The present invention is concerned with a mechanism for opening and closing the blades of an electronic shutter, and more particularly it relates, to a mechanical arrangement for an electronically controlled photographic shutter designed so that its exposure time is determined in accordance with the energizing time of an electromagnet controlled by an electronic exposure time control circuit, said mechanical arrangement being operative so that both the diaphragm aperture and the exposure time are controlled simultaneously by a pair of shutter blades, and that — upon generation by said circuit of an electric signal indicating the termination of an exposure — the exposure aperture is closed immediately in response to this signal.

DESCRIPTION OF THE PRIOR art

An electronically controlled photographic shutter are known which are designed to be operative so that the diaphragm aperture and the exposure time are both controlled simultaneously by a pair of shutter blades and that upon generation — by an electronic exposure time control circuit — of an electric signal indicating the completion of an exposure, the exposure aperture begins to be closed simultaneously therewith, is known.

An example of such a conventional electronic shutter is provided with, for example, two independent sector rings which are both capable of rotating around the exposure aperture. One of these rings is operatively coupled to a speed reduction gear so that the rotation velocity of this ring may be kept within a certain limit as it is rotated. Two shutter blades which constitute a pair are rotatably supported by pins, respectively, which, in turn, are fixed to these two rings, respectively.

The conventional electronic shutter of the type described above is operated in such a way that as the shutter release means is actuated, one of the two rings is rotated at a reduced speed due to the speed reduction gear coupled thereto. In accordance with the motion of this ring, the blades are rotated respectively about the pins serving as the fulcrums and extending from the other of the rings.

On the other hand, when a closure signal is generated by said control circuit, the electromagnet is de-energized, and said the other ring which has till then been held stationary is relieved of its locked state. Whereupon, this latter ring is rotated at a high speed. In accordance with this motion of the other ring, the shutter blades rotated respectively about the pins — serving as the fulcrums — of said one of the rings in the direction opposite to that of their rotation described above, and thus the exposure aperture is closed. In such a shutter of the type described, if a closure signal is generated in the midst of the rotation — at a reduced speed — of said one of the rings, the exposure aperture is closed in accordance with that motion of the blades which represents the relative speeds of rotation of these two rings. Such a motion of the shutter blades will give improper exposure as compared with the instance where the exposure aperture is closed immediately at a high speed upon the generation of a closure signal. Also, such an electronic shutter requires two rings and a speed reducing means, and therefore, a a sufficiently large space is required for accommodation of these component parts. In addition, the mechanism of such a shutter is complicated.

SUMMARY OF THE INVENTION

It is, therefore, a primary object of the present invention to eliminate the foregoing drawbacks and inconveniences inherent to the mechanism of the conventional electronic shutters and to provide a mechanical arrangement for electronically controlled photographic shutters, which is operative so that both the diaphragm aperture and the exposure time are controlled simultaneously by a pair of shutter blades and that upon generation, by an electronic exposure time control circuit, of a signal indicating the ending of the required exposure aperture is closed immediately at a high speed.

Another object of the present invention is to provide a mechanical arrangement of the type described for electronically controlled photographic shutters, which is designed so that a pair of shutter blades are rotatably about pins extending from a ring in such a way that these blades are operatively coupled to each other to effect opening motions in compliance with a cam face and that, upon generation of a closure signal, the closing member is actuated immediately in response to this signal to move said pair of shutter blades in the same closing direction and at a high speed, starting from whatever opening positions which are assumed then by these blades.

A still another object of the present invention is to provide a mechanical arrangement of the type described for electronically controlled photographic shutters, which is designed so that the shutter blades are opened progressively in compliance with a cam face which, in turn, is adapted to engage the moving blades.

A further object of the present invention is to provide a mechanical arrangement of the type described for electronically controlled photographic shutters, which is designed so that, at the time the exposure aperture is opened, the closing member of the shutter blades is held in the retreated position along the cam face and that, upon the generation of a closure signal, said closing member immediately moves toward the center of the exposure aperture after passing beyond the cam face to engage the shutter blades to thereby close the exposure aperture at a high speed.

DESCRIPTION OF THE PREFERRED EMBODIMENTS

Figure 1:
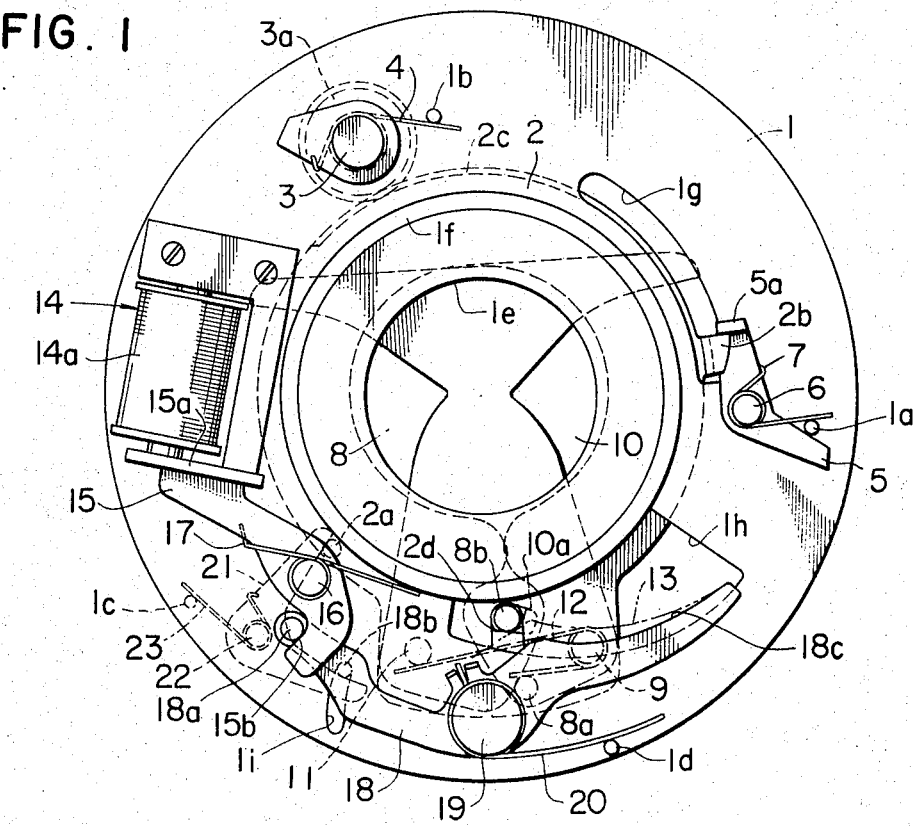
FIG. 1 is a somewhat diagrammatic representation showing the shutter mechanism according to the present invention in its cocked position.
Figure 2:
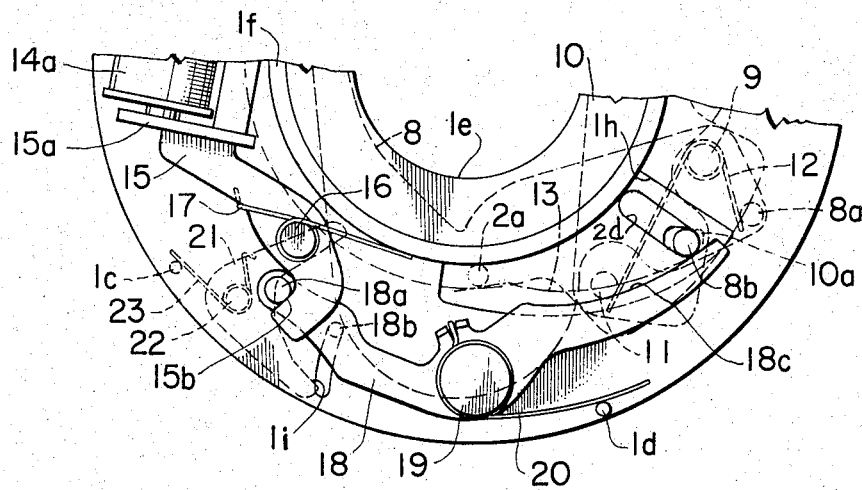
FIG. 2 is a somewhat diagrammatic representation, with parts broken away, showing the shutter mechanism of FIG. 1 in its open position.

In FIGS. 1 and 2, there is shown an electronic shutter arrangement in which a shutter plate 1 has fixed pins 1a, 1b and 1d extending from the front surface thereof, a fixed pin 1c extending from the rear surface of the shutter plate 1, an exposure aperture 1e, a lens mounting tube 1f, and an arcuate slot 1g and a window 1h. A ring 2 has a fixed pin 2a extending from its rear surface,_ a stopper 2b which extends through the arcuate slot 1g to a position beyond the front surface of said shutter plate 1, a gear portion 2c and a radially extending slot 2d. This ring 2 is mounted to the rear surface of the shutter plate 1 in such a way as to be rotatable around said exposure aperture 1e. A cocking shaft 3 having a gear 3a formed integrally therewith on the rear surface side of the shutter plate 1 is rotatably supported by this plate 1 and protrudes beyond the front surface thereof. This cocking shaft 3 is normally urged to rotate clockwise by a spring 4 which is applied between said pin 1b and said cocking shaft 3. The gear 3a meshes with the gear portion 2c of the ring 2. A release lever 5 has a bent portion 5a which is engageable with the stopper 2b of the ring 2. This release lever 5 is rotatably mounted on a pin 6 which extends from the shutter plate 1. A spring 7 applied between said pin 1a and said release lever 5 normally urges this lever 5 to rotate counter-clockwise. A first shutter blade 8 has a fixed pin 8b which is in engagement with the slot 2d of the ring 2 and another fixed pin 8a which extends from the rear face of said first shutter blade 8. This first shutter blade 8 is rotatably mounted on the rear surface of the shutter plate 1 by a pin 9 which extends from the rear face of the ring 2. A second shutter blade 10 has a slot 10a which engages said pin 8b and is rotatably mounted on the rear surface of the shutter plate 1 by a pin 11 which extends from the rear face of the ring 2. A spring 12 is applied between said pin 8a and said pin 11 to normally urge said first blade 8 to rotate counter-clockwise. A cam face 13 is formed on the body of the shutter not shown. As said ring 2 rotates, the pin 8b is displaced in its position along said cam face 13. A winding 14a of an electromagnet 14 is connected to a known electronic exposure time control circuit not shown.

A magnetic lever 15 controlled by winding 14a has a bent armature portion 15a and a stopper portion 15b and is rotatably mounted on a pin 16 which extends from the shutter plate 1. This magnet lever 15 is normally urged clockwise by a spring 17. A closing lever 18 having a fixed pin 18a which extends from the front face thereof, another fixed pin 18b which extends from the rear face of said lever 18 and protrudes beyond the rear surface of the shutter plate 1 through a slot 1i, and a closure action conducting face (hereinafter to be referred to simply as a work face) 18c which is engageable with said pin 8b. This closing lever 18 is rotatably mounted on a pin 19 which extends from the shutter plate 1. A spring 20 is applied between said pin 1d and said closing lever 18 and normally urges said closing lever 18 to rotate counter-clockwise. A lever 21 having two arms which intrude into the travel paths of the pins 2a and 18b respectively is rotatably mounted on the rear surface of the shutter plate 1 by a pin 22 which extends from the rear surface of said plate 1. A spring 23 is applied between the pin 1c and said lever 21 and normally urges said lever 21 to rotate clockwise. Said arms of the lever 21 are engageably with the pin 2a of the ring 2 and the pin 18b of the closing lever 18, respectively.

The shutter having the foregoing arrangement is operated as follows. The shutter which is in the cocked state as shown in FIG. 1 is released as the release lever 5 is rotated clockwise to thereby start its action.

As the release lever 5 is rotated clockwise, a power switch of the exposure time control circuit not shown is closed first, to energize the electromagnet 14.

Thereafter, the bent portion 5a of the release lever 5 which till then has been in engagement with the stopper 2b of the ring 2 relieves its engagement with said stopper 2b. As a result, the ring 2 is rotated counterclockwise via the gear 3a and the gear portion 2c by the restoring force of the tensioned spring 4. Since the pin 2a is displaced in its position in accordance with the movement of the ring 2, the lever 21 is rotated clockwise by the action of the spring 23. As a result, the engagement between the lever 21 and the pin 18b of the closing lever 18 is relieved. Also, the movement of said ring 2 causes the starter switch of the exposure time control circuit not shown to be actuated, and with this the counting of the delay time is started.

The closing lever 18, after the relief of the locking by the lever 21, tends to rotate counter-clockwise by the action of the spring 20. However, the magnet lever 15 is being attracted to the energized electromagnet 14, and therefore the pin 18a of the closing lever 18 is retained in its position by the stopper 15b. On the other hand, the pin 8b of the first shutter blade 8 is caused to move along the cam face 13 by the movement of the ring 2. In accordance with this movement of the pin 8b, therefore, the first shutter blade 8 is caused to rotate counter-clockwise about the pin 9 serving as the fulcrum. It should be noted that said pin 8b is in engagement with the slot 10a of the second shutter blade 10. Therefore, the second shutter blade 10 is caused, at the same time with the first shutter blade 8, to rotate clockwise about the pin 11 serving as the fulcrum.

In this way, the two shutter blades 8 and 10 act so as to open the exposure aperture 1e progressively in accordance with the cooperative actions of the movement of the ring 2 and the cam face 13, as shown in FIG. 2. When the amount of exposure reaches the proper value either during the course of opening or after the full opening of the exposure aperture 1e, said exposure time control circuit suspends the supply of power to the winding 14a of the electromagnet 14. As a result, this electromagnet 14 is deprived of its attracting force and accordingly it relieves the magnet lever 15 of its engagement therewith. Whereupon, the pin 18a of the closing lever 18 is relieved of its engagement with the stopper 15b of the magnet lever 15. As a consequence, the closing lever 18 is caused to rotate counter-clockwise by the spring force of the spring 20. During the foregoing part of operation, the work face 18c of the closing lever 18 urges the pin 8b — which is either moving or has completed its movement — toward the center of the exposure aperture 1e. As a result, the shutter is closed.

It should be understood that the shutter is cocked as the cocking shaft 3 is rotated counter-clockwise and as, accordingly, the stopper 2b of the ring 2 is engaged by the bent portion 5a of the release lever 5. During the course of this cocking action, the pin 2a of the ring 2 causes the lever 21 to be rotated counter-clockwise. This counter-clockwise rotation of the lever 21 causes its arm to push the pin 18b, so that the closing lever 18 is caused to rotate clockwise. Because of the clockwise rotation of this closing lever 18, its pin 18a is brought into engagement with the stopper 15b of the magnet lever 15. Accordingly, the armature portion 15a is urged against the core of the electromagnet 14 by the spring force of the spring 17. During this part of operation, the shutter is rendered to the condition as shown in FIG. 1.

Obviously many modifications and variations of the present invention are possible in the light of the above teachings. It is therefore to be understood that within the scope of the appended claims, the invention may be practiced otherwise than as specifically described.

I claim:

1. An opening and closing mechanism for use with electronic shutters including an electronic exposure control circuit for determining the exposure time; said mechanism comprising an electromagnet connected to said electronic exposure control circuit; a shutter plate fixedly supporting said electromagnet; a sector ring mounted on said shutter plate and capable of being rotated in one direction around an exposure aperture upon shutter release operation; a first shutter blade rotatably mounted on said sector ring and normally urged by spring force to move toward the direction exposing said aperture, said first shutter blade having a pin thereon; a second shutter blade rotatably mounted on said sector ring and interconnected with said first shutter blade to be opened and closed simultaneously with said first shutter blade in interlocking fashion with said first shutter blade said first and second shutter blades respectively pivoted for said rotational motion to the shutter plate; a cam face engaging said pin of said first shutter blade for controlling the opening action of said first shutter blade by engaging this blade as the sector ring is rotated; and a closing member engageable with said pin of said first shutter blade and operable to be locked during the energization of said electromagnet and to be relieved of its locked state upon termination of said energization, said closing member being spring loaded so that it is rotated by spring force when relieved from its locked state to engage said pin of said first shutter blade by said closing member to coercively move this blade in the direction in which the exposure aperture is closed.

2. An opening and closing mechanism for electronic shutters according to claim 1, further comprises a lever pivotably mounted on said shutter plate and engageable with said sector ring and said closing member, said lever being rotated in one direction to be disengaged from said closing member upon shutter release operation and engaging said sector ring to be rotated in another direction, thereby causing said closing member to retreat to a position for non-engagement with said pin of said first shutter blade.

* * * * *